C. T. CARLAND.
BAIL SUPPORT.
APPLICATION FILED OCT. 30, 1919.
1,351,201. Patented Aug. 31, 1920.
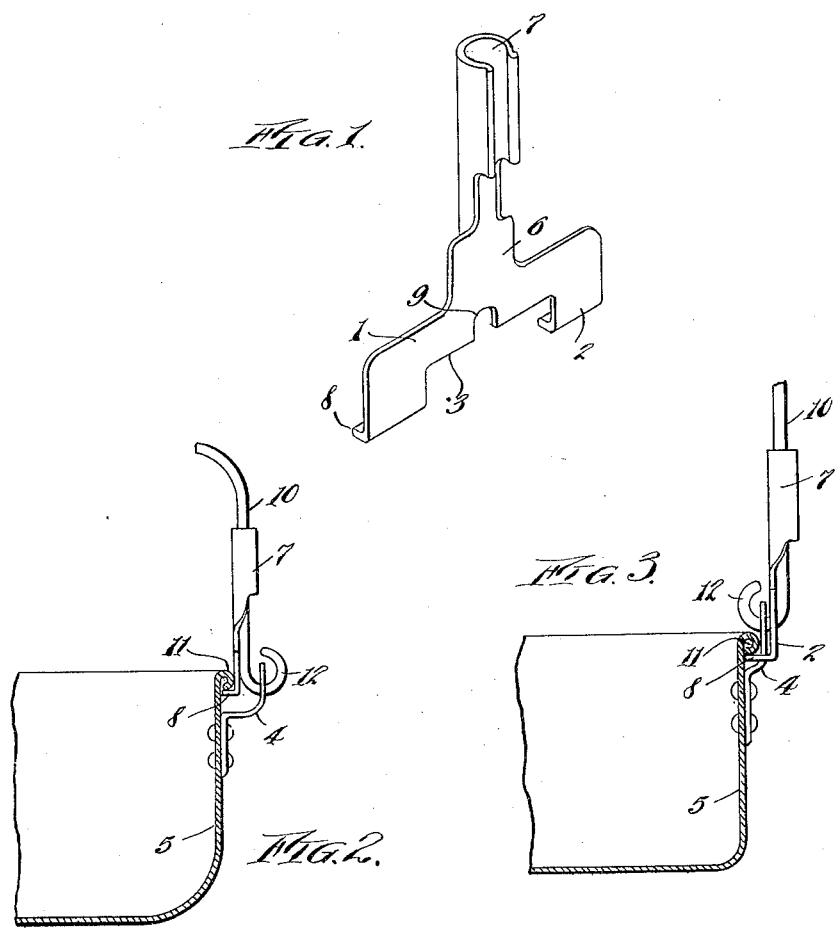
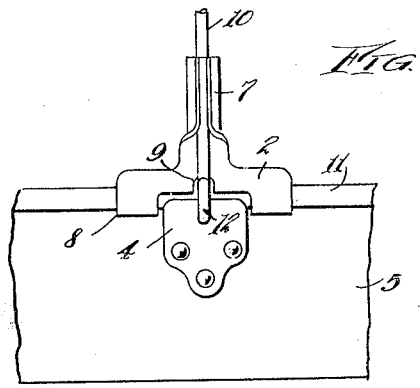

UNITED STATES PATENT OFFICE.

CHARLES T. CARLAND, OF CLEVELAND, OHIO.

BAIL-SUPPORT.

1,351,201.　　　Specification of Letters Patent.　　Patented Aug. 31, 1920.

Application filed October 30, 1919. Serial No. 334,579.

*To all whom it may concern:*

Be it known that I, CHARLES T. CARLAND, a citizen of the United States residing at Cleveland, in the county of Cuyahoga and State of Ohio, have invented certain new and useful Improvements in Bail-Supports, of which the following is a specification.

This invention relates to new and improved locking or supporting devices designed primarily for use on pots, pans, kettles, and the like and is particularly adapted for holding the bail or handle away from the hot body portion of the utensil so as to prevent the heating of the bail or handle due to radiation and other heating properties.

The invention consists of a clamp which may be snapped upon the bail in a simple and efficient manner so as to have one portion thereof engaging a part of the utensil near the point at which the bail is thereto attached.

The invention further consists of certain parts, details and combination of the same as will be more fully described, hereinafter, and pointed out in the appended claim.

Referring to the drawings wherein like reference numerals designate similar parts of reference throughout the various views, Figure 1 is a perspective view of the device; Fig. 2 is a sectional detail showing the manner in which the device is applied to a cooking utensil; Fig. 3 is a similar view but showing the device applied to the bail, said bail being attached to the utensil in a reverse manner to that shown in Fig. 2 and Fig. 4 is an elevation of the parts shown in Fig. 3.

The device consists of a single piece of metal having two legs 1 and 2, the lower ends of the said legs are bent at right angles to themselves in such a manner as to engage the kettle as will be more fully described.

Midway of these legs the material is cut away at 3 to allow the said legs to straddle the ear 4 of the kettle 5, and substantially at the middle portion a vertical extension 6 terminates in a tubular finger 7. This portion 7 is substantially circular in cross section but is open at one side thereof and preferably on the side opposite to the fingers 8 of the legs 1 and 2. The body portion is further provided with a recess 9 for a purpose to be hereinafter described.

It is intended to make the device of a material which will be resilient enough to allow the same to be conveniently applied to various cooking utensils and in a quick and efficient manner.

When in use the tubular portion 7 is snapped about the bail 10 of the utensil with the fingers 8 engaging the under portion of the wired edges 11 of the utensil and owing to the resilience of the metal this can be quickly and efficiently done.

In Fig. 3 I have illustrated the device applied to a different utensil which in this case has the loop 12 whereby the bail 10 is attached to the ear 4 of the utensil curled in reverse direction to that shown in Fig. 2. This necessitates the provision of a recess 9 which allows the locking device to be slipped far enough down to engage the wired edge 11.

With the parts constructed as described it is obvious that when heat or steam issues from under the lid of the utensil the bail or handle is not apt to become heated as it is entirely out of the way of the steam and raised over the hot body portion of the utensil sufficiently to prevent the same from becoming heated through connection. It is furthermore obvious that when it is desired to allow the handle freedom of movement it is merely necessary to disengage the fingers 8 from the bead 11 and to slide the device vertically and upwardly upon the bail whereupon the bail may be moved to any position. The device is furthermore easily detached from the utensil when desired by merely disengaging the fingers 8 and springing the device away from the bail. The opening in the tubular portion 7 and the resiliency of the material readily permitting this.

While I have shown and described this specific form of device in the attached drawings it is evident that numerous modifications may be had by those familiar with the art and I do not wish to limit myself in the construction of the same further than is required by the state of the art or that which comes within the scope of the appended claim.

I claim:

A bail support comprising a single piece of metal having an upright tubular bail clip at its upper end and a cross piece at its lower end, terminating in spaced depending legs the ends of which are turned in at their lower edges to engage the under side of a vessel rim and the cross piece having a notch in its lower edge through which the eye of the bail may extend.

In testimony whereof I do affix my signature in presence of two witnesses.

CHARLES T. CARLAND.

Witnesses:
JOHN A. BOMMHARDT,
ROBERT L. BRUCK.